May 25, 1926.
J. A. PITTENGER
ANTISKID DEVICE
Filed Nov. 27, 1925
1,586,466
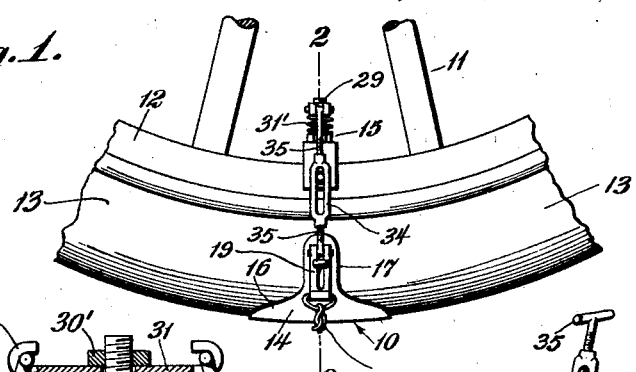
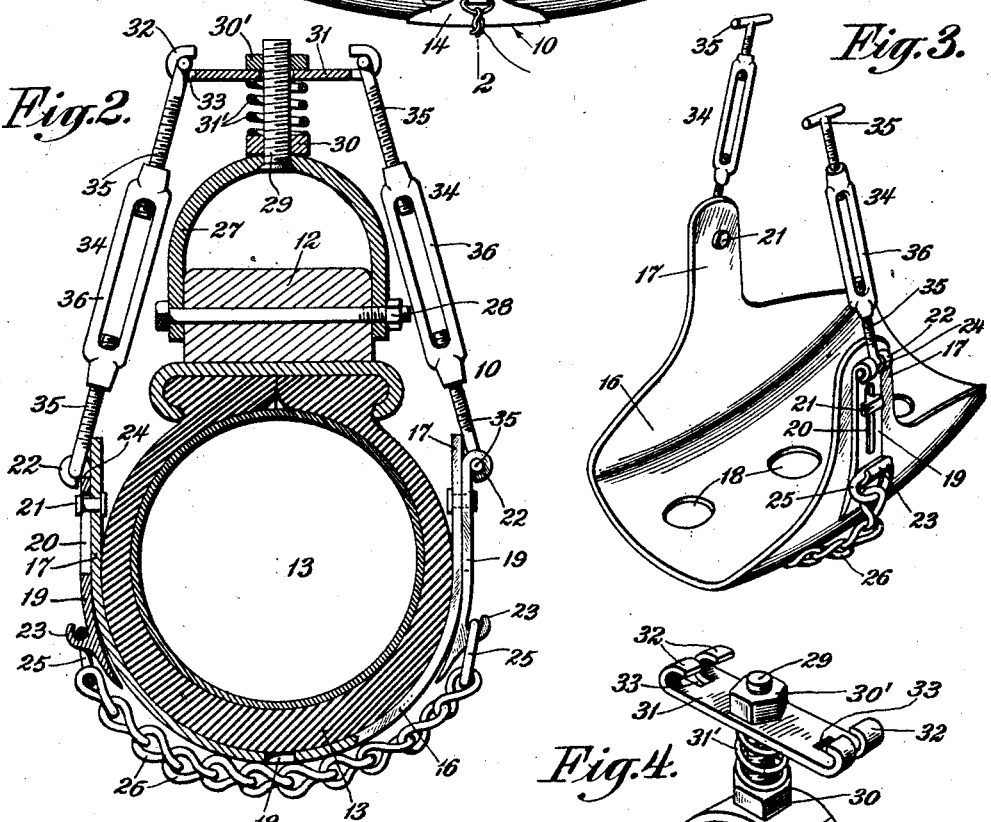
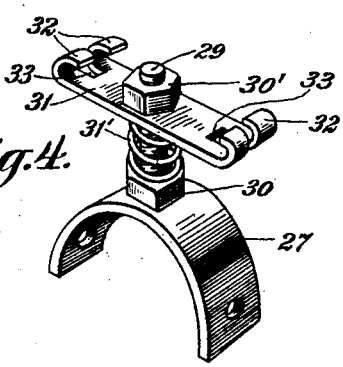
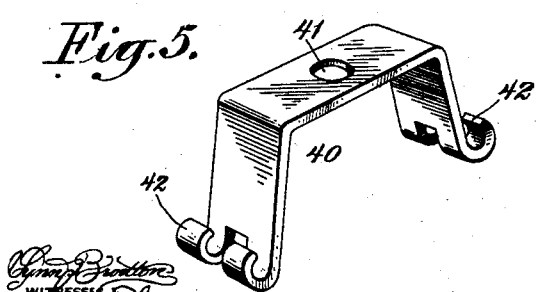
Jacob A. Pittenger
INVENTOR
BY Victor J. Evans
ATTORNEY Patented May 25, 1926.

1,586,466

UNITED STATES PATENT OFFICE.

JACOB A. PITTENGER, OF MILLBURN, NEW JERSEY.

ANTISKID DEVICE.

Application filed November 27, 1925. Serial No. 71,758.

This invention relates to improvements in anti-skid devices for attachment to vehicle wheels of the type equipped with resilient tires.

One of the objects of the invention is to provide an anti-skid device to be positioned at spaced intervals about a wheel to prevent slipping of the wheel on wet or icy roadways, and which includes an armor engaging the outer surfaces of the tire, and an attaching means supported by the felly of a wheel for adjustably securing the armor to tires of different widths.

Another object of the invention resides in an anti-skid device which includes an attaching means adapted to be permanently mounted upon the felly of a wheel, and an armor which may be easily and quickly connected therewith or removed therefrom as the occasion may require.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my improved anti-skid device shown in position upon a portion of a vehicle wheel.

Figure 2 is a vertical transverse sectional view on the line 2—2 of Figure 1.

Figure 3 is a detail perspective view of tire armor.

Figure 4 is a similar view of the attaching means.

Figure 5 is a detail perspective view of a modified form of attaching yoke.

Referring more particularly to the drawing, the reference numeral 10 designates my improved anti-skid device in its entirety and which is shown in the drawing as applied to a portion of a vehicle wheel 11 which includes a felly 12 and a pneumatic tire 13. The devices are adapted to be arranged about the wheel at spaced intervals, the number of devices depending upon the diameter of the wheel. The device broadly includes an armor 14 and an attaching means 15.

The armor 14 comprises a plate or saddle 16 which is curved transversely to snugly fit the tread surface of the tire 13, and the same is provided at its sides with oppositely disposed arms 17. The plate 16 is provided with apertures 18 in order to allow for the drainage of any water which may accumulate between the tire and the plate when the same is in position. Slidably mounted on the arms 17 are lugs 19 each of which is provided with a slot 20 for receiving a pin 21 which extends from the arm 17. The opposite ends of the lugs are formed with hooks 22 and 23, the hooks 22 being bifurcated as at 24 for a purpose to be hereinafter explained. The hooks 23 receive the end links 25 of a length of chain 26 which chain passes about the outside of the plate 16. The links 25 are triangular in plan and one of the side walls of the link is engaged with the hooks 23 on the lugs. By making the end link triangular, the length of chain is held against rotation as the device engages the ground when applied to a vehicle wheel.

The attachment means 15 hereinbefore mentioned, comprises a yoke or bracket 27 which is bolted to the felly 12 as at 28 and which yoke remains in position upon the felly when the armor is removed. A threaded stud 29 extends from the yoke 27 and receives lock nuts 30 and 30'. Interposed between the lock nuts 30 and 30' is a cross arm 31 which may be adjustably supported upon the yoke by adjustment of the lock nut 30' upon the stud. A spring 31' encircles the stud and is interposed between the cross arm 31 and the nut 30 which tends to force the cross arm into engagement with the nut 30'. The ends of the arm 31 are provided with hooks 32 which are bifurcated as at 33 for receiving one end of a turn buckle 34. The other end of each of the turn buckles 34 is received in the bifurcation 24 formed in the lugs 19 and which turn buckles comprise T-shaped rods 35 which are threaded into a manipulating portion 36. The cross pieces of the T-shaped rods are engaged with the hooks 22 and 23 provided on the lugs 19 and the arm 31 respectively.

From the foregoing description, it will be seen that the device may be adjusted to tires of different widths by the manipulation of the turn buckles 34 which tends to set up a clamping action between the cross arm 31 and the armor 14. When a vehicle wheel is equipped with a plurality of these devices, it will be appreciated that skidding is eliminated as the chain will firmly engage the road-bed over which the vehicle may travel. In the event of a puncture to the tire, the spring 31' will take up any slack between the parts and will primarily prevent the turnbuckles from separating from the cross arm.

In Figure 5 of the drawing, I have shown a modified form of attaching yoke 40 which may be substituted for the arm 31 in the preferred form when the device is to be applied to truck wheels. The yoke is provided with a central opening 41 for the passage of the stud 29 and the free ends of the yoke are provided with hooks 42 similar to hooks 32 provided on the arm 31 shown in the preferred form.

While I have described what I deem to be the most desirable embodiment of my invention, it is obvious that many of the details may be varied without in any way departing from the spirit of my invention, and I therefore do not limit myself to exact details of construction herein set forth nor to anything less than the whole of my invention limited only by the appended claims.

What is claimed as new is:—

1. In combination with a vehicle wheel having a felly and a tire mounted thereon, a plate fitted against the tread surface of said tire, a length of chain extending transversely over said plate, attaching means supported by said felly, and adjustable clamping means for exerting a pull on the ends of said chain for holding said plate against said tire, said last means including lugs mounted for sliding movement on opposite sides of said plate and to which the end links of said chain are respectively secured.

2. An anti-skid device comprising a saddle member adapted to fit about the tread surface of a tire, opposed lugs slidably mounted on said saddle member, a length of chain having its ends connected with said lugs, attaching means, and adjustable clamping means for holding said chain in a taut condition against said saddle member.

In testimony whereof I have affixed my signature.

JACOB A. PITTENGER.